United States Patent
Kamite

(10) Patent No.: US 7,285,311 B2
(45) Date of Patent: Oct. 23, 2007

(54) PROCESS FOR COATING-DECORATING MOLDED RESIN PRODUCTS

(75) Inventor: Masayuki Kamite, Tokyo (JP)

(73) Assignee: Misawa Homes Co., Ltd., Tokyo (JP)

( * ) Notice: Subject to any disclaimer, the term of this patent is extended or adjusted under 35 U.S.C. 154(b) by 256 days.

(21) Appl. No.: 10/938,298

(22) Filed: Sep. 10, 2004

(65) Prior Publication Data

US 2005/0112293 A1     May 26, 2005

(30) Foreign Application Priority Data

Sep. 11, 2003    (JP)  ............................. 2003-319867

(51) Int. Cl.
*B05D 3/06* (2006.01)
*B05D 1/38* (2006.01)
*B29B 17/00* (2006.01)

(52) U.S. Cl. ...................... 427/508; 427/258; 427/322; 264/132; 264/37.29

(58) Field of Classification Search ................ 427/508, 427/258, 322; 264/132, 37.29
See application file for complete search history.

(56) References Cited

U.S. PATENT DOCUMENTS 6,677,045 B1 * 1/2004 Meisenburg et al. ...... 428/424.2
2002/0062545 A1 * 5/2002 Niedermair .................. 29/417

FOREIGN PATENT DOCUMENTS

JP     11-070508     *   3/1999

OTHER PUBLICATIONS

Hawley's Condensed Chemical Dictionary, e.d by R.L. Lewis, 13$^{th}$ Edition, 1997, pp. 995 & 997.*

* cited by examiner

*Primary Examiner*—Fred J. Parker
(74) *Attorney, Agent, or Firm*—Blakely, Sokoloff, Taylor & Zafman; Stephen M. De Klerk

(57) ABSTRACT

A process is provided for coating/decorating molded resin products having excellent waterproofing properties, which is able to simply and effectively reuse waste FRP. The surface of the molded resin product obtained by mixing, melting, and making mixture 8 containing wood-derived cellulose fine powder 3, resin-derived resin powder 7, and waste FRP 4-derived FRP powder 5 into a given form is coated/decorated. In the process for coating/decorating molded resin products, the surface of the molded resin product is subjected to UV coating/decorating, and after roughening, the surface is subjected to the UV coating/decorating again.

5 Claims, 2 Drawing Sheets

PROCESS FOR COATING-DECORATING MOLDED RESIN PRODUCTS

CROSS-REFERENCE TO RELATED APPLICATIONS

The present patent application claims priority from Japanese Patent Application No. 2003-319867, filed on Sep. 11, 2003.

FIELD OF THE INVENTION

The present invention mainly relates to a process for coating/decorating molded resin products made by recycling waste FRP, such as a bathtub and/or other waterproof vessels in a bathroom.

BACKGROUND OF THE INVENTION

Bath tubs and other water-proof vessels, etc. in a bathroom usually use fiber-reinforced plastics (FRP) as molding materials. However, such molded products are difficult to break down or burn off when they become waste products. The treatment of these waste products becomes a social problem. Therefore, processes for effective recycling of waste FRP have been researched in recent years.

For example, one prior art method involves using a first mold and a second mold. It is known that there is a temperature difference between the first mold and the second mold. The molding material, which comprises thermosetting plastic resin and contains no waste FPR, freezes on the first mold at the high temperature side and the first layer forms by combining the first mold and the second mold. In one prior art process, the molded resin product having the first layer and second layer is prepared by coarsely crushing the frozen molded waste FRP into FRP coarse powder in advance, freezing the molding material obtained by incorporating a given amount of the FRP coarse powder into an unfrozen thermosetting resin on the first layer, and combining the molds (Refer to the "Patent Literature" 1- JP 8-244055). In the preparation of the second layer, the molding material containing FRP coarse powder is frozen and the molds are combined in the stage when the side of the second mold in the first layer has not fully frozen.

However, the process as disclosed in Patent Literature 1 for making the molded resin product has the disadvantage of too many procedures since a second molding procedure is needed which forms the second layer on the first layer using a molding material containing FRP coarse powder after preparing the first layer using the thermosetting plastic resin containing no FRP coarse powder before the first layer fully freezes. There also exists the problem of separation of the first layer from the second layer since different procedures are used in molding the two layers.

As a surface treatment, an outer protection layer is coated after the surface of the molded resin product is coated with a color sanding sealer, and a UV coating is then carried out at last. The UV coating generally possesses an excellent waterproof property and one UV coating is enough for the waterproof property. However, waterproof performance should further be improved when the product is used as a material of the floor and wall of a bathroom. Therefore, a coating with a certain thickness must be formed on the surface of the molded resin product, and the thickness of the coating formed by one UV coating is limited.

DISCLOSURE OF THE INVENTION

In order to overcome the drawbacks of the prior art, the object of the present invention is to provide a process for coating/decorating molded resin products made by recycling waste FRP, such as, for example, the bathtub and/or other waterproof vessels in a bathroom having an excellent waterproof performance.

To achieve the object of the present invention, the present invention is characterized in that the process for coating the molded resin product comprises coating/decorating the surface of the molded resin product made by mixing, melting, and making mixture 8 containing wood-derived cellulose fine powder 3, resin-derived resin powder 7, and waste FRP 4-derived FRP powder 5 into a given form. In the process for coating/decorating molded resin products, the surface of the molded resin product is subjected to UV coating/decorating, and after roughening, the surface is subjected to aforesaid UV coating/decorating again.

The use of the invention can enhance the compactness of the UV coating formed in the second coating and form a UV coating with a certain thickness which is hard for the prior art to reach since the surface of the molded resin product is subjected to UV coating/decorating to form a UV coating with a certain thickness in the beginning, and after roughening, the surface is subjected to the UV coating/decorating again. Thus the formed UV coating with a certain thickness possesses an excellent waterproof performance and makes the product applicable as a material for building the floor and wall, etc. of bath places in a bathroom.

In addition, the present invention is good for effective use of resources and environment protection since the molded resin product is made by mixing, melting, and molding mixture 8 containing cellulose fine powder 3, resin powder 7, and FRP powder 5 into a given form, and thereby it is possible to effectively reuse waste FRP 4 which is hard to dispose.

In addition, unlike the prior art, wherein FRP powder 5 and the other materials are molded individually, FRP powder 5 is first mixed with cellulose fine powder 3 and resin powder 7, and then mixture 8 is made into a given form, so the molded resin product is made in one step and the execution is simplified. Furthermore, the obtained molded resin product possesses a wood feeling since it contains cellulose powder 3.

Waste FRP 4, for example, can be used as a floor, wall, bathtub, and waterproof vessel, etc. in a bathroom.

The invention may be characterized in that in the process of claim 1 for coating/decorating the molded resin product, the first coating/decorating forms a coating with a thickness in the range of about of 30-60 μm on the surface of the molded resin product, and the second coating/decorating forms a coating with a thickness in the range of about 10-30 μm on the surface of the molded resin product.

The use of the invention can make a molded resin product having an excellent waterproof performance since the first coating/decorating forms a coating with a thickness in the range of about 30-60 μm, and the second coating/decorating forms a coating with a thickness in the range of about 10-30 μm The reason why the thickness of the coating formed in the first coating/decorating is in the range of about 30-60 μm is that a coating thinner than 30 μm makes it hard to roughen the surface, and a coating thicker than 60 μm is hard to execute.

The reason why the thickness of the coating formed in the second coating/decorating is in the range of about 10-30 μm is that a coating thinner than 10 μm makes it hard to improve the waterproof performance, and a coating thicker than 30 μm is hard to execute.

The invention may be characterized in that in the process for coating/decorating the molded resin product, before the UV coating/decorating, the surface of the molded resin product is treated with a silane treating agent and then treated with flame for oxidation.

The use of the invention can enhance the bonding performance of the surface of the molded resin product since it is subjected to flame treating for oxidation after silane treating and thereby improve the quality of finishing processing in the following procedures of printing wood grain patterns and coating/decorating The invention may be characterized in that in the process for coating/decorating the molded resin product, wood grain patterns are printed on the surface of the molded resin product before the UV coating/decorating and after the flame treatment.

The use of the invention can improve the apparent quality of the molded resin product since before the UV coating/decorating and after flame treating, wood grain patterns are printed on the surface of the molded resin product, and by means of these wood grain patterns, hard FRP particles easily appearing on the surface of the molded resin product do not draw people's attention.

The invention may be characterized in that in the process for coating/decorating the molded resin product, the wood is waste wood 2 containing impurities, the resin is waste resin 6 made from polypropylene resin and packing films 6 made from polyolefin resins.

The use of the invention may be good for effective use of resources and environment protection since waste wood 2, waste resin 6, and packing films 6 can be reused.

Waste wood 2 includes the waste wood thrown away when buildings like houses and so on are disaggregated, waste wood thrown away when furniture is disaggregated, and wood head and scraps thrown away in civil engineering, etc.

The use of the process of the present invention for coating/decorating the molded resin product can enhance the compactness of the secondly formed UV coating and form a UV coating with a certain thickness which is hard for the prior art to reach since the surface of the molded resin product is subjected to UV coating/decorating, and after roughening, the surface is subjected to the UV coating/decorating again. Therefore, the surface possesses an excellent waterproof performance and makes the product applicable as a material for building the floor and wall of a bathroom.

Furthermore, the process is good for execution compared to the prior art since it can make the molded resin product in one step by molding the mixture containing FRP into a given form. The process is good for effective use of resources and environment protection since it can effectively reuse waste FRP which is hard to dispose. In addition, the process can make molded resin products with a wood feeling since the obtained molded resin product contains cellulose fine powder.

Figure 1:
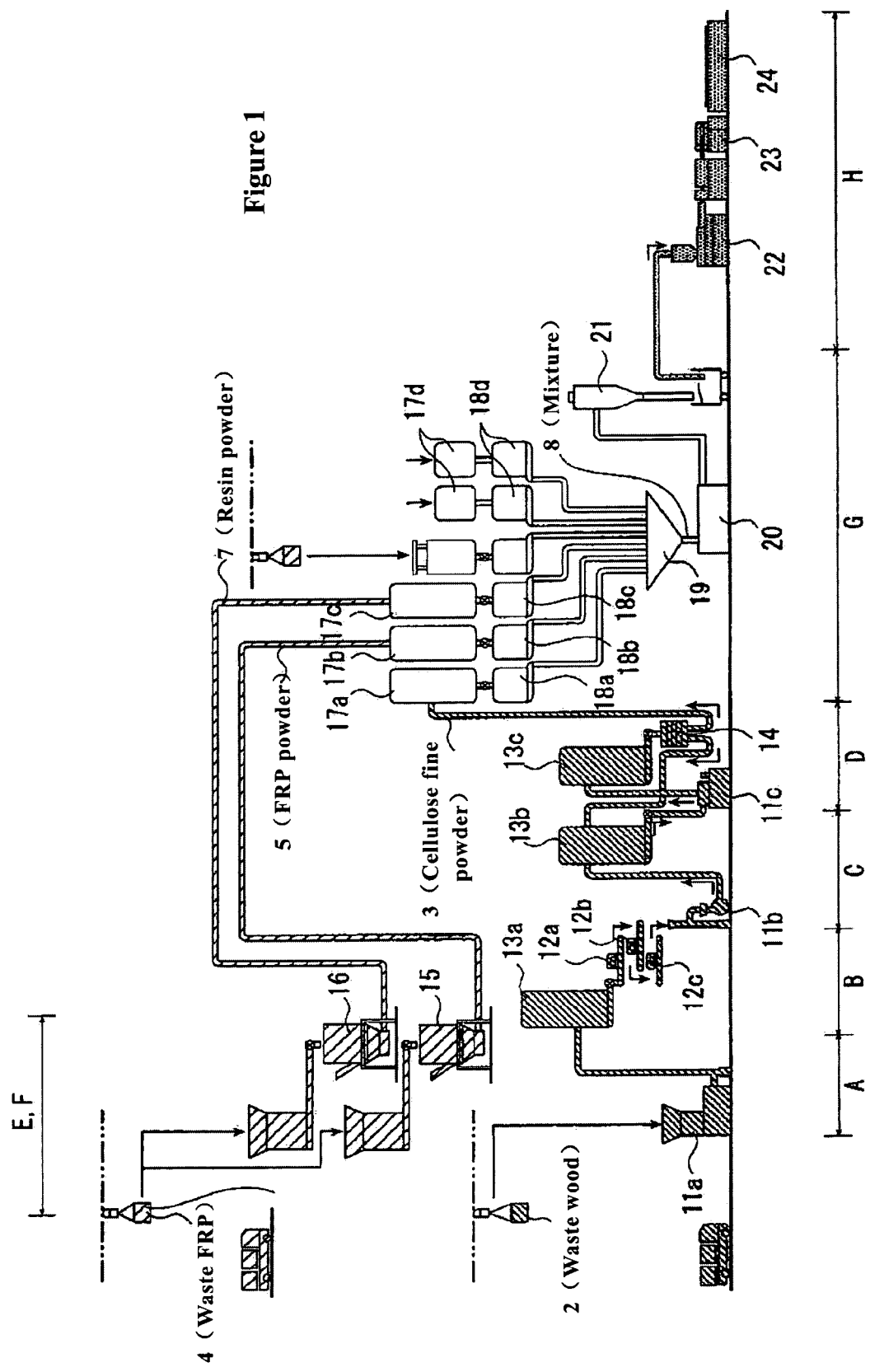
FIG. 1 is the schematic diagram showing one embodiment of the present invention and the apparatus for making the molded resin product.

Illustration of the label in the drawings:
2 Waste Wood
3 Cellulose Fine Powder
4 Waste FRP
5 FRP powder
6 Waste Resin
7 Resin Powder
8 Mixture

EMBODIMENT FOR CARRYING OUT THE INVENTION

The embodiment of the present invention will be illustrated below.

Figure 2:
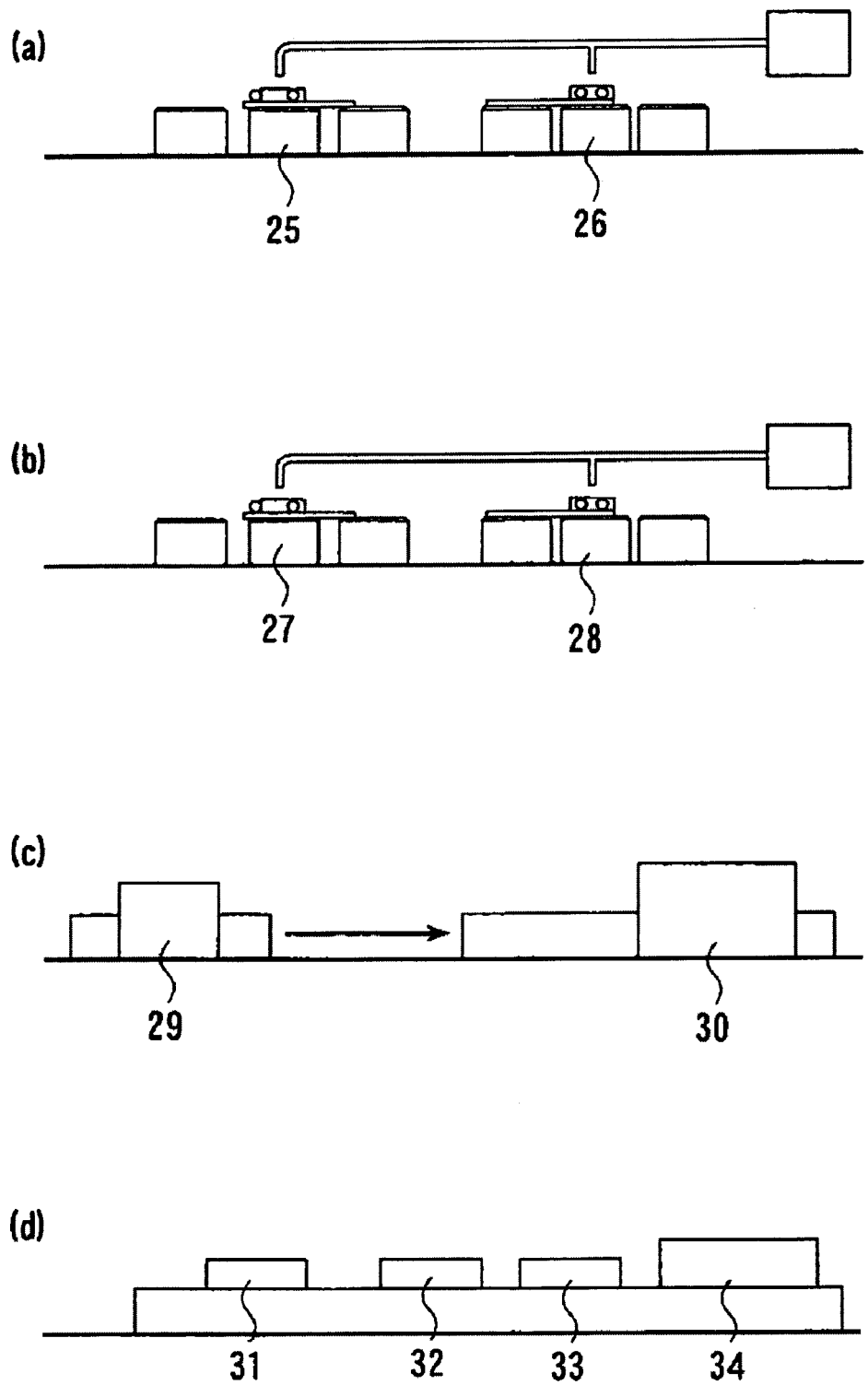
FIG. 2 is the same as FIG. 1, and FIG. 2 (*a*)-FIG. 2 (*d*) are schematic diagrams of the apparatus for making the molded resin product.

FIGS. 1 and 2 are the schematic diagrams of the apparatus for making the molded resin product used in the process for coating/decorating molded resin products of the present invention.

In the present embodiment, the apparatus 1 used in the process for coating/decorating molded resin products shown in FIG. 1 for making the molded resin product will be illustrated.

As shown in FIG. 1, apparatus 1 for making the molded resin product is equipped with wood crushing means (crushing devices 11*a*, 11*b*, and 11*c*), FRP powder crushing means (crushing device 15), resin crushing means (crushing device 16), mixing-melting means (mixing funnel 19, pelletizer 20), and molding means (extruder 22). The wood crushing means (crushing devices 11*a*, 11*b*, and 11*c*) provides cellulose fine particles 3 by crushing waste wood 2. The FRP crushing means (crushing device 15) provides FRP fine powder 5 by crushing waste FRP 4. The resin crushing means (crushing device 16) provides resin power 7 by crushing waste resin 6. The mixing/melting means (mixing funnel 19, pelletizer 20) makes a mixture 8 by mixing and then melting cellulose fine particles 3, FRP fine powder 5, and resin powder 7. The molding means (extruder 22) makes the mixture 8 into a given form.

In addition, silane treating means (silane treating machine 31), flame treating means (flame treating machine 31), printing means (printing machine 32), and UV coating/decorating means (vacuum coating/decorating machine 33) are provided. The silane treating means (silane treating machine 31) treats the surface of the derived molded resin product with a silane treating agent. The flame treating means (flame treating machine 31) treats the surface with flame for oxidation after silane treating. The printing means (printing machine 32) prints wood grain patterns on the surface of the derived molded resin product after flame treating. The UV coating/decorating means (vacuum coating/decorating machine 33) coats/decorates the surface of the molded resin product after printing, and after roughening, the aforesaid coating/decorating is carried out again.

First, waste wood 2 with a size of 4-5 cm is crushed into particles having a size of several millimeters using apparatus 1 for making molded resin products (primary wood crushing procedure A).

Waste wood 2 includes waste wood thrown away when buildings like houses, etc are disaggregated, waste wood thrown away when furniture is disaggregated, and wood head and scraps thrown away in civil engineering projects, etc.

The crushing device (wood crushing means) 11*a* used in primary wood crushing procedure A is a crushing device able to crush massive wood into particles with a size of several millimeters. In particular, crushing device 11a has many bulges on the surface of its two opposite rollers. The crushing device 11a crushes the material passing through the gap between the rollers by pressurizing the rollers while they are rotating. Crushing device 11a is certainly not limited to such a device, and other coarsely crushing devices with the same function can also be used. For example, jaw crushers can also be used wherein the feed is placed between a clamp and a vibrating jaw forming an upward V-shape opening and crushed by pressurizing. Other coarse crushing devices, such as a continuous rotary crusher, can also be used wherein a movable crushing face rotates in a fixed crushing face.

Then, the crushed waste wood 2 is sent to wood powder storage tank 13a. The metals which can adsorb on magnets, stainless steel, and nonferrous metals which possess conductivity but do not adsorb on magnets are removed from waste wood 2 stored in wood powder storage tank 13a with iron-removing machine 12a having strong magnets, stainless steel separator 12b, and nonferrous metal separator 12c, respectively (separation procedure B).

Then, the primarily crushed material (waste wood 2) which has passed through the primary wood crushing procedure and metal removing step is crushed into fine powder in secondary wood crushing procedure C. The crushing device 11b used in the second wood crushing procedure C (wood crushing means) is a device able to crush massive materials into fine powder with a size of about 1 mm. In particular, crushing device 11b is a hammer crusher which uses fast rotating hammer picks to repeatedly crush the material until the material passes through the circular sieve holes around the hammer tips. Crushing device 11b is certainly not limited to the aforesaid hammer crusher, and other crushing devices having the same function can be used instead. For example, crushing device 11b may be a cutter which uses cutting knives for crushing, or a roll-type crusher which crushes the material by pressing rollers.

Then, the secondarily crushed material (waste wood 2) which has passed through the second crushing procedure C is sent to the wood powder storage tank 13b.

The secondarily crushed material stored in storage tank 13b is made into cellulose fine powder 3 by crushing. Crushing device 11c used in the third wood crushing procedure (wood crushing means) D is a device able to crush the material obtained in the second wood crushing procedure C into a still finer powder.

In particular, crushing device 11c may be a pin-type crusher, which is a device able to carry out crushing by the action of impact and rebound of the pins equipped on a disc. More particularly, the pin-type crusher is equipped with a rotary disk with many needles in the upward vertical direction, and a fixed disc facing the rotary disk and having many pins. The material obtained in the second crushing procedure C is fed to the center of the rotary disc, thrown into the gaps among the pins installed on the rotary and fixed discs by the centrifugal force, subjected to the action of impact and rebound of the pins, and thus crushed into fine powder. In the third wood crushing procedure D, the material is crushed into particles with a size about 300 μm. Crushing device 11c is certainly not limited to pin-type crushers, other finely crushing devices having the same crushing function such as ball-type crushers and stone mortars can also be used.

In the aforesaid wood crushing procedures A, B, and C, the recovered waste wood 2 is crushed in three stages, and thus the recovered waste wood 2 is crushed stagewise and effectively.

Cellulose fine powder 3 passing through the third crushing procedure D is then sent to wood powder storage tank 13c, and screened with a sieve of 300 μm to obtain particles with an average diameter of 300 μm.

That is to say, after screening cellulose fine powder 3 with sieve 14, the fine powder bigger than 300 μm returns to crusher 11c for additional crushing, while the fine powder smaller than 300 μm is sent to subsequent wood measuring tank 17a for storage.

Waste FRP 4 is crushed into FRP powder 5 with an average diameter less than 50 mm using FRP crushing means 16 (waste FRP crushing procedure E).

That is to say, waste FRP crushing procedure E has the same procedures as the first wood crushing procedure A, the second wood crushing procedure C, and the third wood crushing procedure D using the same crushers as crushers 11a, 11b, and 11c. The illustration of FRP crushing procedure E is omitted because it is the same as the crushing procedures A, C, and D.

The waste products, such as the floor and wall, bath tub, and other water-proof vessels in a bathroom, can be used as waste FRP 4.

The obtained FRP 5 is then stored in FRP measuring tank 17b.

Waste resin 6 is crushed into resin powder 7 with an average diameter less than 3 mm using resin crushing means 18 (resin crushing procedure F).

That is to say, the resin crushing procedure F has the same procedures as the first wood crushing procedure A, the second wood crushing procedure C, and the third wood crushing procedure D using the same crushers as crushers 11a, 11b, and 11c. The illustration of resin crushing procedure F is also omitted.

The waste products derived from packing film coated for maintaining the surface of a bath tub, food vessels and drink packages, and trays, etc. can be used as waste resin 6.

A film using olefin resin as a raw material is preferred. The waste food vessels and packages and trays using polypropylene resin, polyvinyl chloride resin, polyethylene resin, foaming vinyl chloride resin, polystyrene resin, or ABS resin as raw materials are preferred. The waste using polypropylene resin as a raw material is most preferred.

Obtained resin powder 7 is then stored in resin measuring tank 17c.

Afterwards, cellulose fine powder 3 stored in wood measuring tank 17a, FRP powder 5 stored in FRP measuring tank 17b, and resin powder 7 stored in resin measuring tank 17c are charged into mixing funnel (mixing-melting means) 19 through corresponding measuring instruments 18a-18c installed on the corresponding measuring tanks 17a-17c. At this time, the pigment, hardening agent, lubricant such as acid-modified polyolefin's and so on, stored in storage tank 17d of auxiliary materials are also charged into mixing funnel 19 through individual measuring instrument 18d. Various materials are mixed and molten to yield uniform mixture 8 (mixing procedure G).

On the basis of mixture 8, 10-65% by weight of cellulose fine powder 3, 10-30% by weight of FRP powder, 25% by weight of polypropylene resin 7, 10% by weight of film powder 7, 9% by weight of pigment, 0.5% by weight of hardening agent, 3% by weight of lubricant are charged into mixing funnel 19 after measuring with corresponding measuring instruments 18a-18d.

Differing from batch measuring instruments, measuring instruments 18a-18d of the present embodiment are continuous measuring instruments which continuously measure various materials and charge them into mixing funnel 19.

Batch measurement is that various measuring tanks feed the materials to corresponding measuring instruments until the amount reaches a given value, and then the materials are charged into the mixing funnel. The continuous measurement of the present embodiment is to continuously feed various materials to corresponding measuring instruments 18*a*-18*d* from corresponding measuring tanks 17*a*-17*d* and then to mixing funnel 19 in a given proportion.

Various materials are charged into mixing funnel 19 in a given proportion by using such a continuous measuring mode, therefore, particles can be continuously made in the following procedure and the productivity can be raised.

Afterwards, mixture 8 in mixing funnel 19 is charged into pelletizer (mixing-melting means) 20, which extrudes and molds mixture 8 from the mold while precisely cutting it into particles with a given size, and then the particles are cooled. The lead screw in the cylinder of pelletizer 20 is double-shaft type, able to uniformly mix and melt mixture 8.

The obtained particles are then charged into the funnel of extruder (molding means) 22 through cyclone 21, extruded using the lead screw in the cylinder while being heated in the cylinder, and then extruded from the mold at the front end of the cylinder and made into the molded resin product with a given form (molding procedure H).

In the molding procedure H, it is desired that the molding temperature is set at 160-220° C., preferably at 170-185° C. The reason why the molding temperature is set at 160-220° C. is that resin powder 7 can not fully soften at a temperature below 160° C. and therefore is hard to uniformly mix with cellulose fine powder 3, but some changes like carbonization, etc. would take place if the molding temperature exceeds 220° C.

Because the molding temperature is set at 160-220° C., cellulose fine powder 3 obtained in wood crushing procedures A, C, and D does not change by heat, and resin powder 7 can fully soften and uniformly mix with cellulose fine powder 3 in molding procedure H.

It is desired that extruder 22 is equipped with two molds. Two molds make it possible to make two molded resin products at the same time, and thereby the productivity can be raised.

The molded resin product extruded from the mold is drawn by drawing machine 24 and cut into a given length by cutter 24.

The molded resin product made in the way as described above should be subjected to surface treatment.

The surface treatment will be illustrated below referring to FIGS. 2 (*a*)-2(*d*).

As shown in FIG. 2 (*a*), the form of the molded resin product is first regulated using setting machine 25. Setting machine 25 is equipped with an opening having roughly the same form as the outline of the molded resin product to be molded and an inner diameter equal to the outer diameter of the same to finish the cross-sectional form and size of the molded resin product by inserting the molded resin product into the opening.

The finished molded resin product is then chamfered with chamfering machine 26 and then roughened with abrasive paper as shown in FIG. 2 (*b*) to form many lines on the surface of the molded resin product by roughening. It is desired that the surface of the molded resin product is first abraded with coarse abrasive paper (e.g. 120# abrasive paper), and then abraded with fine abrasive paper (e.g. 180# abrasive paper).

The molded resin product is then cut into a given length with cutter 28 while following the movement of the molded resin product.

As shown in FIG. 2 (*c*), the molded resin product molded by cutting with cutter 28 is then coated/decorated with roller coating machine 29, and then charged into drying oven 30 for drying.

Afterwards, as shown in FIG. 2 (*d*), the surface of the molded resin product is firstly treated in silane treatment machine 31 using, for example, silane such as organic siloxane, and then subjected to flame treatment with flame treating machine 31 (flame treating).

The so called flame treatment is to bond the coat with the molded resin product and directly bake the surface of the molded resin product for oxidation with the flame of a gas inflamer.

Wood grain patterns can be printed on the surface of the flame treated molded resin product using printing machine (printing means)32. At this time, wood grain patterns are first printed on the surface of the flame treated molded resin product, and then the practical application part is printed. It is desired that the printing is completed in two steps.

Afterwards, the surface of the molded resin product is coated with UV coating using vacuum coating/decorating machine (UV coating/decorating means)33, and then dried in UV drying oven 34. The dried surface of the molded resin product is roughened, coated with a coating once again using vacuum coating/decorating machine 33, and dried in UV drying oven 34.

Vacuum coating/decorating machine 33 is equipped with a vacuum chamber which has an inlet part and an outlet part for the molded resin product to be coating-decorated to pass through. The molded resin product is impregnated with coating in the chamber, and the unwanted coating is removed at the outlet part to form a specified coating-decorated film.

It is desired that the thickness of the first coating layer is in the range of about 30 to 60 µm and that of the second coating layer is in the range of about 10 to 30 µm.

The UV coating used includes, for example, photopolyacrylate, etc.

By using the embodiment of the process of the present invention for coating/decorating the molded resin product as mentioned above, the compactness of the secondly formed UV coating can be enhanced and a UV coating with a certain thickness which is hard for the prior art to reach can be formed because the surface of the molded resin product is subjected to UV coating/decorating, and after roughening, the surface is subjected to UV coating/decorating again. The UV coating with a certain thickness has an excellent waterproof performance and makes the product applicable in building the floor and wall of bath places in a bathroom.

In addition, the present invention is good for effective use of resources and environment protection since mixture 8 of cellulose fine powder 3, resin powder 7, and FRP powder 5 is mixed, molten and molded into a given form to make the molded resin product, and waste FRP 4 which is hard to dispose can be effectively reused.

Compared to the prior art, the present invention is good for execution since it can make the molded resin product in one step. In addition, the derived molded resin product has a wood feeling since it contains cellulose fine powder 3.

Furthermore, the bonding performance of the surface of the molded resin product is enhanced because the surface of the molded resin product is oxidized by the flame treatment following the silane treatment with silane treating machine 31, therefore the quality of the finishing processing in the following procedures, i.e., wood grain pattern printing and coating/decorating, can be improved.

The apparent quality of the molded resin product can be improved because wood grain patterns are printed on the surface of the molded resin product before the UV coating/decorating and after the flame treatment, and thereby the hard FRP particles easily appearing on the surface of the molded resin product do not draw people's attention.

The present invention is good for the effective use of resources and protection of the environment even only in view that the resin is waste resin 6 made from polypropylene resin and packing film 6 made from polyolefin resins, and the wood is waste wood 2 containing impurities.

The present invention is not limited to the above embodiment, and adequate changes can be made within the scope of the present invention.

In the present embodiment, cellulose fine powder 3 is obtained from but not limited to waste wood 2, and it can also be, for example, the material obtained by crushing wood, bagasse, and rice straw, etc.

The surface processing is not limited to the above processing, and adequate changes can be made. For example, embossing processing can be used to form grooves on the surface of the molded resin product.

What is claimed:

1. A process for coating molded resin products, comprising:
    applying a first decorative coating with UV coatings of a surface of the molded resin product obtained by mixing, melting, and forming a mixture containing cellulose fine powder less than 300 μm derived from wood, resin powder, and FRP powder derived from waste FRP materials;
    roughening the resulting surface; and
    applying a second decorative coating with UV coatings of the roughened surface.

2. The process for coating molded resin products of claim 1, wherein applying the first decorative coating forms a coating with a thickness in the range of about 30-60 μm on the surface of the molded resin product, and applying the second decorative coating forms a coating with a thickness in the range of about 10-30 μm on the surface of the molded resin product.

3. The process for coating molded resin products of claim 1, wherein before applying the first decorative coating, the surface of the molded resin product is subjected to silane treatment with an organic siloxane, and then subjected to flame treatment for oxidation.

4. The process for coating molded resin products of claim 3, wherein wood grain patterns are printed on the surface of the molded resin product before applying the first decorative coating and after the flame treatment.

5. The process for coating molded resin products of claim 1, wherein the wood is waste wood and the resin is waste resin of polypropylene resin and packing films of polyolefin resins.

* * * * *